United States Patent Office 2,775,521
Patented Dec. 25, 1956

2,775,521
METHOD OF FORTIFYING GRAIN PRODUCTS AND THE RESULTING PRODUCT

Michael Mateles, Nutley, and Peter Fredrick Widmer, Hawthorne, N. J., assignors to Hoffmann-La Roche Inc., Nutley, N. J., a corporation of New Jersey No Drawing. Application September 29, 1953, Serial No. 383,136

13 Claims. (Cl. 99—11)

This invention relates to the enrichment of grain products, more particularly cereal grains, with vitamins and minerals. A particular aspect of our invention relates to the enrichment of dehulled rice and corn grits with vitamin C (ascorbic acid).

Cereal grains such as rice and corn grits are frequently fortified with vitamins and minerals to restore the nutrients lost in the commercial milling process. The familiar polished white rice of commerce is now generally enriched after milling with vitamin $B_1$, niacin, iron and phosphorus. The vitamins and minerals may be added to each grain of rice or a highly fortified premix may be diluted with the conventional polished white rice to produce a mixture which, in cooking, provides an enriched rice preparation. A method of enriching rice and similar food products is described in U. S. Patent No. 2,475,133, issued July 5, 1949.

Vitamin C does not occur naturally in a cereal grain such as rice but it is frequently desirable to incorporate this vitamin to overcome nutritional deficiencies particularly in those people for whom rice forms a substantial part of their diet. Vitamin C is only sparingly soluble and is partially destroyed in the acid medium by means of which the thiamine and niacin are conventionally introduced into the rice. Therefore, it is not feasible to add vitamin C to rice by this method.

According to the present invention, vitamin C is incorporated in cereal grains such as rice or corn grits by adding the vitamin C to the grain in the form of a dry powder. This may conveniently be effected by dusting the cereal grain, previously enriched with thiamine and niacin and covered with a protective coating, with a solid powder comprising vitamin C and talc. The vitamin C dusted grain is then covered again with an additional layer of protective coating. Since the vitamin C content of enriched rice or corn grits is subject to washing losses, i. e., certain amounts of the vitamin are lost by solution in the water when the rice or corn grits are water rinsed according to universal custom, we have further discovered that washing losses of vitamin C are curtailed by incorporating an edible higher fatty acid such as stearic acid, palmitic acid, or salts thereof, in the dusting powder containing the vitamin C. The fatty acid is also employed in the solid form. The proportion of fatty acid employed in the dusting powder may vary within broad limits, but an amount within the range of about 0.5 to 2 parts by weight of higher fatty acid per part of vitamin C is preferred.

According to our invention, the milled cereal grain is first impregnated with a solution containing thiamine and niacin, and, after drying, the grain is coated with a layer of protective material. While the protective coating is still somewhat tacky, the enriched foodstuff is dusted with a powder comprising a mixture of vitamin C, a higher fatty acid and talc, covered with an additional layer of protective coating and dusted again with talc. The minerals may be introduced with the vitamin C if desired. The protective coating in each case comprises a corn protein or prolamine such as zein or another edible, water-repellent film. An adhesive agent such as abietic acid and a plasticizer such as stearic acid may also be incorporated in the protective coating. The adhesive agent and the plasticizer added to the protective coating are independent of and perform a different function from the higher fatty acid which is included with the vitamin C in order to curtail washing losses.

In this manner, each grain of milled cereal grain may be vitaminized or a highly fortified pre-mix may be formed by enriching only a portion of the milled product with concentrated amounts of the vitamins and minerals. In either case, the enriched grain comprises a grain kernel impregnated with water-soluble vitamins, a first protective coating, a second coat comprising vitamin C and an edible, higher fatty acid, and a third, protective coating. The second coat comprising vitamin C may include minerals such as iron and phosphorus.

The following example is illustrative of our process:

Example 1

A vitamin solution containing 190 gm. thiamine, and 2400 gm. niacin in a solution of 1400 gm. of sulfuric acid and 2700 cc. of water was sprayed onto 430 pounds of rice in a rotating trumbol. The vitamin enriched rice was then dried for one hour. One half of a coating solution comprising 2000 gm. zein, 1625 gm. Neo-Fat No. 1–65 (a commercially available fatty acid mixture containing 90 percent stearic acid, 6 percent palmitic acid and 4 percent oleic acid) and 13.75 gm. abietic acid in a solution of 500 cc. of water and 13750 cc. of isopropanol was sprayed onto the dried vitaminized rice. A vitamin C powder containing 5450 gm. vitamin C fine powder, 4000 gm. stearic acid and 5450 gm. talc was screened through a 20 mesh screen and then dusted onto the rice from movable hoppers in the rotating trumbol while the protective coating was still tacky. The rice was dried for approximately one hour. The remaining half of the coating solution was added and then the rice was dusted with 7500 gm. talc. The rice was finally dried for one hour.

The product assayed 9800 mg. vitamin C, 340 mg. thiamine, and 4800 mg. niacin per pound of rice. When tested for loss of vitamin C by water washing, the washing loss was 2.4 percent.

We claim:

1. A method for fortifying grain products which comprises applying a dry mixture comprising vitamin C and an edible higher fatty acid to the grain and coating the vitamin enriched grain with an edible, water-repellent coating.

2. A method for enriching cereal grains with vitamin C which comprises applying a dry mixture comprising vitamin C and an edible higher fatty acid to the cereal grain and coating the vitamin enriched cereal grain with an edible coating comprising a prolamine.

3. A method according to claim 2 in which the cereal grain is a member of the group consisting of rice and corn grits.

4. A method for enriching cereal grains with vitamin C which comprises coating the grain with a dry mixture comprising vitamin C and stearic acid and covering the vitamin enriched grain with a coating comprising zein.

5. A method for enriching rice with vitamin C which comprises coating rice with a dry mixture comprising vitamin C and stearic acid and covering the enriched rice with a coating comprising zein.

6. A method of enriching rice with vitamins and minerals which comprises impregnating the rice with a first solution of vitamins, coating the enriched rich with an edible, water-repellent coating, coating the said rice with minerals and a second vitamin containing dry mixture comprising vitamin C and an edible higher fatty acid, and coating the vitamin enriched rice with a second edible, water-repellent coating.

7. A method of enriching rice with vitamins and minerals which comprises impregnating rice with a solution comprising thiamine and niacin, drying the impregnated rice, covering the enriched rice with a coating comprising zein, dusting the enriched and coated rice with a dry powder comprising vitamin C, iron, phosphorus, stearic acid and talc, and coating the rice with a second coating comprising zein.

8. Grain fortified with a dry mixture comprising vitamin C and an edible higher fatty acid and coated with an edible, water-repellent coating.

9. Rice fortified with a dry mixture comprising vitamin C and an edible higher fatty acid and coated with an edible, water-repellent coating.

10. Rice dusted with a dry mixture comprising vitamin C and stearic acid and covered with a coating comprising zein.

11. Grain impregnated with water soluble vitamins, coated with an edible water-repellent coating, dusted with a dry mixture comprising vitamin C, minerals and an edible higher fatty acid, and coated with a second edible, water-repellent coating.

12. An enriched cereal grain comprising a grain kernel impregnated with water-soluble vitamins, a first coat comprising an edible, water-repellent coating, a second coat comprising a dry mixture of vitamin C, minerals and an edible higher fatty acid, and a third coat comprising an edible, water-repellent coating.

13. An enriched rice comprising a rice kernel impregnated with thiamine and niacin, a first, protective coating comprising zein, a second coat comprising a dry mixture of vitamin C, iron, phosphorus and stearic acid, and a third, protective coating comprising zein.

References Cited in the file of this patent
UNITED STATES PATENTS

| | | |
|---|---|---|
| 2,284,804 | De Angelis | June 2, 1942 |
| 2,475,133 | Furter | July 5, 1949 |
| 2,508,477 | Stievater et al. | May 23, 1950 |